United States Patent [19]

Felter et al.

[11] 4,310,581

[45] Jan. 12, 1982

[54] SURFACE COVERING ARTICLES

[75] Inventors: Richard E. Felter; Larrimore B. Emmons; John R. Eshbach, Jr.; Thomas Posipanko, all of Lancaster, Pa.

[73] Assignee: Armstrong Cork Company, Lancaster, Pa.

[21] Appl. No.: 117,821

[22] Filed: Feb. 4, 1980

[51] Int. Cl.³ .................. B32B 5/12; B60C 9/12; B29H 17/02

[52] U.S. Cl. .................. 428/109; 156/178; 156/179; 156/297; 156/298; 428/113; 428/114; 428/294; 428/376; 428/379; 428/398

[58] Field of Search .......... 428/294, 295, 297, 376, 428/398, 106, 107, 109, 110, 112, 113, 114, 379, 209, 210, 203; 156/178, 179, 244.12, 244.13, 297, 298

[56] References Cited

U.S. PATENT DOCUMENTS

| | | | |
|---|---|---|---|
| 2,744,044 | 5/1956 | Toulmin, Jr. | 428/297 |
| 3,091,561 | 5/1963 | Marzocchi et al. | 428/294 |
| 3,556,918 | 1/1971 | Lemelson | 428/294 |
| 3,720,572 | 3/1973 | Soda et al. | 428/218 |
| 3,785,919 | 1/1974 | Hickman | 428/398 |
| 3,811,996 | 5/1974 | Polk | 428/71 |
| 3,887,750 | 6/1976 | Duckett et al. | 428/398 |
| 3,932,245 | 1/1976 | Erb | 428/159 |
| 3,936,518 | 2/1976 | Soda et al. | 428/151 |
| 3,980,513 | 9/1976 | Omori et al. | 156/306 |
| 4,002,789 | 1/1977 | Klein | 428/294 |
| 4,039,718 | 8/1977 | Kallenborn | 428/398 |
| 4,051,210 | 9/1977 | Wallenberger | 428/376 |
| 4,109,038 | 8/1978 | Hayashi et al. | 428/398 |
| 4,141,944 | 2/1979 | Anstadt et al. | 264/45.5 |
| 4,148,958 | 4/1979 | Tischer et al. | 428/294 |

*Primary Examiner*—William J. Van Balen

[57] ABSTRACT

An article which has utility as a surface covering for materials such as resilient flooring, furniture, walls, ceilings, counter tops and the like is produced by aligning and embedding a plurality of hollow fibers or metallic fibers on or near the surface of a translucent medium. The article is typically in the form of a film, sheet, or board.

21 Claims, No Drawings

SURFACE COVERING ARTICLES

BACKGROUND OF THE INVENTION

This invention relates generally to surface covering articles and more specifically to the field of simulated wood grain surface covering articles. The invention also relates to a method of making a surface covering article which possesses the unique visual qualities of a finished wood product and which can be of particular use in the resilient floor and furniture industries.

Surface coverings, and in particular resilient floorings, are selected by the consumer largely on the basis of durability, ease of maintenance and cost. Consumers have, in recent times, been bypassing the use of finished wood floors in favor of resilient synthetic floors for economic reasons and for ease of maintenance. However, because of the beauty of a finished wood floor, many efforts have been made to simulate the look of wood grains on resilient flooring. For example, one well-known method of producing simulated wood grain is to reproduce photographically a wood grain pattern and apply it to a suitable base surface. Other well-known methods include applying a wood grain pattern by printing or engraving means, such as hot stamping foils and roll and rotogravure printing or by heat transfer means. However, such surface coverings invariably merely resemble wood, appearing even on a casual glance as being a wood simulation. This is caused in part because real wood has physical structure and surface qualities that give it a visual image when finished that cannot be reproduced by printing or photographic means alone. In particular, many finished wood products have visual qualities that change, in reference to the viewer, with the angle of incident light on the surface of the wood. This effect, which is sometimes known as directional flip, may be noted by the transformation of the area viewed from light to dark shades and vice versa as the angle of incident illumination and/or the angle of view are changed. Natural wood also possesses in its wood grain a sheen or luster and, even on smooth surfaces, a non-surface texture three dimensional effect which are difficult, if not impossible, to duplicate in a printed or photographically reproduced pattern.

It is an object of the present invention to provide surface covering articles with many of the visual properties set forth above which can be employed on flooring, furniture, countertop surfacing products and the like. It is a further object to supply a surface covering material that possesses many of real wood's visual qualities through the use of nonwood materials.

These objects have been surprisingly accomplished in an effective manner through the incorporation, in a surface covering, of aligned hollow fibers, metallic fibers, or mixtures thereof, to simulate the light scattering qualities of real wood's fibrous lumen. It has been discovered that both hollow fibers and metallic fibers possess qualities which promote the reflective scattering of incident light in a manner similar to that of real wood. In the case of hollow fibers, these qualities are due in part to the variation of the refractive index at the fiber material air hollow interface. In the case of metallic fibers, such visual qualities are created in part by the relatively large refractive index variation between the fiber and the binder in which they are in contact. Through the use of such aligned hollow and/or metallic fibers there is provided a unique, aesthetically attractive, functional resilient wood replication which can be employed, for example, as a floor covering material and which has many of the visual properties of real wood.

SUMMARY OF THE INVENTION

The surface covering articles [hereinafter articles(s)] of the present invention are produced by aligning and embedding hollow or metallic fibers in a translucent binder or medium. The fibers are aligned in a unidirectional, as opposed to a random orientation. The article is thus formed as a solid, translucent substrate and will generally be in the form of a film, sheet or board. The article may be utilized without modification. Alternatively, a decorative pattern, such as a wood grain pattern, may be applied, such as by printing and/or embossing techniques, to either side of the article. The articles of the present invention are applied to the surface to be covered by, for example, heat-pressure transfer or via the use of a standard adhesive.

DETAILED DESCRIPTION OF THE INVENTION

Hollow fibers suitable for use in this invention can be made from inorganic materials such as glass, quartz, and polymers such as polyesters, polypropylene, polyvinyl alcohol, polyamides (such as nylon) and the like. Suitable fibers are available commercially, such as, for example, DuPont's Antron III 756A, which is a hollow fiber made from nylon 66, a condensation product of adipic acid and hexamethylenadiamine, and DuPont's Dacron 808T, which is a polyester hollow fiber.

Although, as indicated above, hollow fibers used herein can be constructed from a wide variety of materials, all such hollow fiber materials must be at least sufficiently translucent so that light will pass freely through the fiber material, with a minimum of diffusion, into the air filled cavity within. Thus, it is understood that the term "translucent," as used herein, encompasses transparent and semi-transparent materials which are also suitable for use as fiber materials. It has been discovered that real wood's visual properties can be most realistically simulated when the hollow fiber material has a light refractive index of preferably from about 1.4 to about 1.6, relative to the light refractive index of air.

The metallic fibers suitable for use herein can be made from such metals as steel, aluminum, copper and tin and alloys such as bronze. Alternatively, the metallic fibers can be constructed from a non-metallic fiber material, such as plastic, quartz or glass, which is then coated with a metal or alloy such as is set forth above.

The hollow and metallic fibers utilized in the present invention are generally cylindrical in shape. The hollow fibers have at least one cavity extending along the fiber's horizontal axis. Additionally, the hollow and metallic fibers may be in the form of a tri or tetralobal filament. The outer diameter of the hollow and metallic fibers will preferably range from about 0.5 mil to about 125 mils. The minimum length of the hollow and metallic fibers should be about 10 mil, as it is difficult to properly align shorter fibers. The maximum length of the hollow and metallic fiber is not critical; in fact, they can be "continuous," i.e., run the length of the finished article.

The binder or medium in which the hollow and metallic fibers are embedded should be comprised of a material at least sufficiently translucent so that there will be no interference with the light scattering properties of the hollow and metallic fibers. Thus, transparent and semi-transparent materials will also be suitable for use as a medium in which the hollow and metallic fibers are embedded. For best results, the refractive index of the medium should range from about 1.4 to about 1.6, relative to the refractive index of air. The medium can be comprised of materials such as, for example, plasticized polyvinyl chloride resins, copolymers of vinyl chloride and vinyl acetate or polyvinylidene chloride, and polyolefins, such as polyethylene and polypropylene, and polystyrene resins.

For those applications where, in addition to the other wood-like visual qualities described above, a low gloss surface texture effect is desirable, an open cell, porous foam can be used as the medium material to carry the fibers. It has been discovered that foams resemble finished wood products in that they have a low degree of specular reflection. Examples of open cell foams which are suitable as a fiber medium are urethane, urea formaldehyde, and phenolics.

In the process of this invention, hollow and/or metallic fibers are "embedded" in or "intimately associated" with the medium. These terms, as used herein, means that the fibers may be either (a) deposited on the surface of the medium, aligned in a unidirectional orientation such as by brushing with a stiff steel wire brush, and secured to the surface of the medium through the use of a suitable adhesive, or (b) deployed in a unidirectional orientation within the body of the medium. If the fibers are incorporated within the medium, they should generally lie sufficiently close to the surface of the medium so that their light scattering properties are apparent. If an open celled foam is utilized as the medium, the fibers can be incorporated within the foamable material and then the material can be blown and cured to form the substrate. Flexible or rigid foams can be utilized.

For best results, the fibers are preferably employed in a concentration of from about 0.25 g to about 50 g per square ft. of the outer surface of the substrate. The optimum concentration to be employed is dependent on variables such as (1) the degree of transparency of the binder; (2) the composition of the hollow fiber material; (3) the physical structure and composition of the metallic fiber surface; and (4) the decorative effect desired by the individual practitioner of the invention.

The decorative pattern may be applied to the article in a number of ways. For example, direct printing or heat transfer techniques which are well known in the art may be employed. Furthermore, the decorative pattern may be embossed on the article to thereby give the article an added degree of three dimensionality. Also, a printed decorative pattern may be embossed to give a heightened three dimensional effect. Alternatively, the decorative pattern may be applied to one surface of a thin, transparent wear layer which can then be applied by pressure and heat to the outer surface of the article. The thin wear layer may be a poly(vinyl chloride) film.

As used herein in reference to the article of the present invention, the terms "inner surface" and "inner side" both refer to the surface of the article that, when applied, is closest to the material being covered. The terms "outer surface" and "outer side" both refer to the surface of the article that is furthest from the material being covered. When a decorative pattern is applied to the outer side of the article such a pattern will be semi-transparent to the degree that it will not obscure the light scattering qualities of the fibers.

In another embodiment of this invention, the decorative pattern can be applied directly to the material being covered, whereafter the surface covering article of the invention is applied to the material.

If the decorative pattern is a wood grain pattern, its realistic appearance will be enhanced by applying the pattern so that the direction of the wood grain is parallel to the direction in which the fibers are aligned.

The article of the invention may be modified, if desired, to duplicate the cross grain (or ray) structure of real wood, which is very difficult to simulate by printing. Cross grain structure is produced by a tree's radial growth against a normal grain structure and appears as tiny markings which are not aligned with the direction of the grain.

In order to realize a simulated woodgrain article that has such a cross grain effect, the article is first prepared according to the procedures set forth above up to, but not including, the application of the wood grain decorative pattern. To product the ray effects, a pattern of small markings which are similar in size and configuration to the rays of real wood are embossed on the outer surface of the article in any direction which is not in align with the grain direction of the fibers. The embossing step will shift the orientation of the fibers in the embossed area from the direction of the grain. When coupled with the application of a wood grain pattern on the outer surface of the article, this shift provides an optical effect comparable to the ray effects of real wood and, in addition, enhances the article's appearance of three-dimensionality. After the embossing step, the substrate can be compressed during the print application of the decorative pattern (for example, by heat transfer) without losing the desired cross grain effect because the fibers will not completely realign during the printing step.

In another variation of the invention, surface covering articles of the present invention can be chipped or cut into smaller pieces without destroying their unique visual qualities. These chips or pieces are then arranged in a standard binder or grout in any number of decorative styles, such as in a checkerboard or a parquetry, according to the needs of the individual practitioners of the invention. The desired visual effect can be further varied by using predyed hollow fibers of different colors in the chips. Alternatively, the chip binder can be colored or both the hollow fibers in the surrounding binder or grout can have separate complimentary colors.

EXAMPLE I

In this example hollow fibers were utilized in the formation of a surface covering sheet for a resilient flooring.

Continuous strands of DuPont's Antron III 756A hollow fiber yarn were stretched in parallel over a metal frame. The yarn was coated with a vinyl chloride plastisol. The plastisol was cured at 300° F. to form a sheet 30 mil thick. The sheet contained an average of 14 strands of hollow fiber yarn per linear inch, with each strand having 82 hollow fibers, each having an average diameter of about 2 mil.

To form the resilient flooring, the sheet was laminated to a 25 mil thick asbestos-containing rubberized felt backing, which was produced by beater saturating asbestos fibers with a rubber latex in an acqueous system. The felt product was then formed on conventional papermaking equipment. Such felt products are well known: see, for example, U.S. Pat. Nos. 2,375,245; 2,613,190; and 2,739,813.

A walnut wood grain print pattern was applied, via Decoply heat-transfer printing, to the outer surface of the hollow fiber-containing sheet so that the print's wood grain ran in substantially the same direction as that in which the hollow fibers were oriented. A 6 mil thick plasticized vinyl chloride wear layer was then applied, at 300° F. and 350 psi, to the walnut wood grain print.

The resilient flooring thus formed displayed many of real wood's visual qualities, including three dimensionality, directional flip, and luster.

COMPARATIVE EXAMPLE I

The procedure of Example I was repeated exactly to form a resilient flooring, except that hollow fibers were not utilized in the process. The resulting wood grain resilient flooring had the appearance of imitation wood and did not possess wood's visual qualities of three dimensionality, directional flip, or luster.

EXAMPLE II

In this example metallic fibers were utilized in the formation of a surface covering sheet for a resilient flooring.

A pressure sensitive, transparent adhesive was applied to one surface of a 6 mil plasticized vinyl chloride film. M. B. Associates Metafil ® ¼" long aluminized glass fiber flock was distributed on the adhesive surface in a concentration of approximately 1.35 g per square ft. of surface area. The flock was brushed with a wire brush so that the fibers were generally oriented in the same direction. A 4 mil thick polyurethane clear wear surface was applied over the fiber covered surface. The resulting resilient flooring exhibited three dimensionality and directional flip.

What is claimed is:

1. A process for producing an article suitable for use as a surface covering, said process comprising embedding, in a unidirectional orientation, a plurality of hollow fibers in a translucent medium to form the article as a solid translucent substrate with an inner and outer surface.

2. A process for producing an article suitable for use as a surface covering, said process comprising embedding, in a unidirectional orientation, a plurality of metallic fibers in a translucent medium to form the article as a solid translucent substrate with an inner and outer surface.

3. A process for producing an article suitable for use as a surface covering, said process comprising embedding, in a unidirectional orientation, a plurality of a mixture of hollow fibers and metallic fibers in a translucent medium to form the article as a solid translucent substrate with an inner and outer surface.

4. The process of claim 1, 2 or 3 comprising the additional step of applying a decorative pattern to a surface of the substrate.

5. The process of claim 4 wherein the decorative pattern is applied to the outer surface of the substrate.

6. The process of claim 5 wherein a translucent wear layer is applied on top of the decorative pattern.

7. The process of claim 4 wherein the decorative pattern is a wood grain pattern in which the direction of the grain is substantially the same as the direction in which the fibers are aligned.

8. The process of claim 1 wherein the hollow fibers are comprised of nylon 66.

9. The process of claim 1, 2 or 3 wherein the medium is plasticized polyvinyl chloride.

10. The process of claim 1, 2 or 3 wherein the medium is an open celled urethane foam.

11. The process of claim 2 wherein the metallic fibers are aluminized glass fibers.

12. The process of claim 1, 2 or 3 wherein a plurality of samll markings are embossed on the outer surface of the substrate in a direction that is not in align with the direction in which the fibers are oriented and thereafter a wood grain decorative pattern is applied to the outer surface of the substrate.

13. A surface covering article which comprises a solid translucent substrate having an inner and outer surface, said substrate having intimately associated therewith a plurality of hollow fibers, said fibers being aligned in a unidirectional orientation.

14. A surface covering article which comprises a solid translucent substrate having an inner and outer surface, said substrate having intimately associated therewith a plurality of metallic fibers, said fibers being aligned in a unidirectional orientation.

15. A surface covering article which comprises a solid translucent substrate having an inner and outer surface, said substrate having intimately associated therewith a plurality of a mixture of hollow fibers and metallic fibers, said fibers being aligned in a unidirectional orientation.

16. The surface covering article of claim 13, 14 or 15 which further comprises a decorative pattern which is positioned on a surface of said substrate.

17. The surface covering article of claim 16 wherein the decorative pattern is positioned on the outer surface of said substrate.

18. The article of claim 17 further comprising a wear layer positioned on top of the decorative pattern.

19. The article of claim 17 wherein the decorative pattern is a wood grain pattern in which the direction of the grain is substantially the same as the direction in which the fibers are aligned.

20. The article of claim 13 wherein the hollow fibers are comprised of nylon 66.

21. The article of claim 14 wherein the metallic fibers are aluminized glass fibers.

* * * * *